United States Patent [19]

Cuckson et al.

[11] E Re. 30,951

[45] Reissued Jun. 1, 1982

[54] THERMOPLASTIC STRIPS FOR SLIDING CLASP FASTENERS

[75] Inventors: Eric E. Cuckson, Vaucluse; Arthur L. Jones, Glenbrook, both of Australia

[73] Assignee: Scovill Inc., Waterbury, Conn.

[21] Appl. No.: 21,001

[22] Filed: Mar. 16, 1979

Related U.S. Patent Documents

Reissue of:

[64] Patent No.: 3,414,948
Issued: Dec. 10, 1968
Appl. No.: 582,918
Filed: Sep. 29, 1966

[51] Int. Cl.[3] ..... A44B 19/00

[52] U.S. Cl. ..... 24/205.13 R; 24/205.16 R

[58] Field of Search ..... 24/205.13 R, 205.16 R, 24/205.1

[56] References Cited

U.S. PATENT DOCUMENTS

| | | | |
|---|---|---|---|
| 2,045,884 | 6/1936 | Sundback . | |
| 2,242,794 | 5/1941 | Puschner . | |
| 2,463,840 | 3/1949 | Winterhalter . | |
| 2,496,925 | 2/1950 | Winterhalter . | |
| 3,039,408 | 6/1962 | Uhrig . | |
| 3,047,922 | 8/1962 | Schwendt et al. . | |
| 3,072,991 | 1/1963 | Alberts et al. . | |
| 3,179,996 | 4/1965 | Clauss | 24/205.1 R |
| 3,196,196 | 7/1965 | Burbank . | |
| 3,268,646 | 8/1966 | MacFee . | |
| 3,328,857 | 7/1967 | Burbank . | |

FOREIGN PATENT DOCUMENTS

| | | |
|---|---|---|
| 226386 | 11/1959 | Australia . |
| 225646 | 7/1962 | Austria . |
| 55919 | 3/1939 | Denmark . |
| 128592 | 6/1974 | Denmark . |
| 1135394 | 8/1962 | Fed. Rep. of Germany . |
| 1164724 | 3/1964 | Fed. Rep. of Germany . |
| 1267898 | 5/1968 | Fed. Rep. of Germany . |
| 52927 | 4/1938 | Netherlands . |
| 252123 | 9/1948 | Switzerland . |
| 389234 | 7/1965 | Switzerland . |
| 7944 | of 1913 | United Kingdom . |
| 491692 | 9/1938 | United Kingdom . |
| 540006 | 10/1941 | United Kingdom . |
| 571691 | 9/1945 | United Kingdom . |
| 871458 | 6/1961 | United Kingdom . |
| 874041 | 8/1961 | United Kingdom . |
| 903855 | 8/1962 | United Kingdom . |
| 968952 | 9/1964 | United Kingdom . |
| 976929 | 12/1964 | United Kingdom . |

*Primary Examiner*—Roy D. Frazier
*Assistant Examiner*—Peter A. Aschenbrenner
*Attorney, Agent, or Firm*—Dallett Hoopes

[57] ABSTRACT

A strip for a stringer of a sliding fastener which is constituted by a row of successive discrete transverse strip elements which are interconnected at their opposite ends by two longitudinally extending cords, each element having an enlarged central portion and opposed leg portions with enlargements at their ends through which the cords pass and are embedded. The strip is bent to a U-shape and stitched to a mounting tape.

7 Claims, 6 Drawing Figures

THERMOPLASTIC STRIPS FOR SLIDING CLASP FASTENERS

Matter enclosed in heavy brackets [ ] appears in the original patent but forms no part of this reissue specification; matter printed in italics indicates the additions made by reissue.

This invention relates to the production of synthetic thermoplastic strips adapted to constitute the interlocking elements on a sliding clasp fastener. More particularly, the invention concerns strips of this kind which are capable of moulding or extrusion and are intended to be attached to a tape in a folded condition to form the stringer for the fastener.

Several attempts have already been made to produce a row of interlocking elements for a sliding clasp fastener as integral parts of a thermoplastic strip which is firstly formed as a flat strip from which a series of cutouts along the length of the strip are removed. The resultant strip is of ladder-like structure entirely of synthetic thermoplastic material having continuous longitudinal strands either extending in parallel lines, or in zig-zag fashion, laterally along the length of the strip. Prior to attachment of the strip to a tape it is folded across its width, i.e. along it longitudinal center line, to become U-shaped in end elevation.

Due particularly to the double thickness of the continuous longitudinal strands of thermoplastic material, a degree of stiffness is imparted to the length of the stringer and therefore the resulting fastener. Furthermore, these strips are relatively brittle and susceptible to breakage if pinched.

It is the object of this invention to provide thermoplastic strips for the interlocking elements of sliding clasp fasteners, which are substantially free from the above defects.

The invention in one general form, therefore, provides a strip for use in the production of a stringer of a sliding clasp fastener, comprising a row of transversely extending strip-like thermoplastic elements, an enlarged central portion on each element, and a pair of parallel yarn threads onto which at spaced intervals the ends of the transverse elements are cast.

Also the invention provides a stringer for a sliding clasp fastener comprising a row of strip-like thermoplastic elements, a substantially rectangular enlargement on each end of each element, an enlarged central portion on each element, a narrow stem joining each central portion with each end enlargement, an intermediate enlargement formed on each of said stems, each stem being bent substantially at right angles to produce a U-shaped longitudinal fold down the row of transverse elements, a mounting tape having one longitudinal edge portion located within the fold, and stitching in a longitudinal line down said edge portion of the tape with individual stitches passing around respective ones of said stems between the intermediate enlargements and their adjacent rectangular end enlargements.

Two preferred embodiments of the invention are illustrated in the accompanying drawings, in which.

Figure 1:
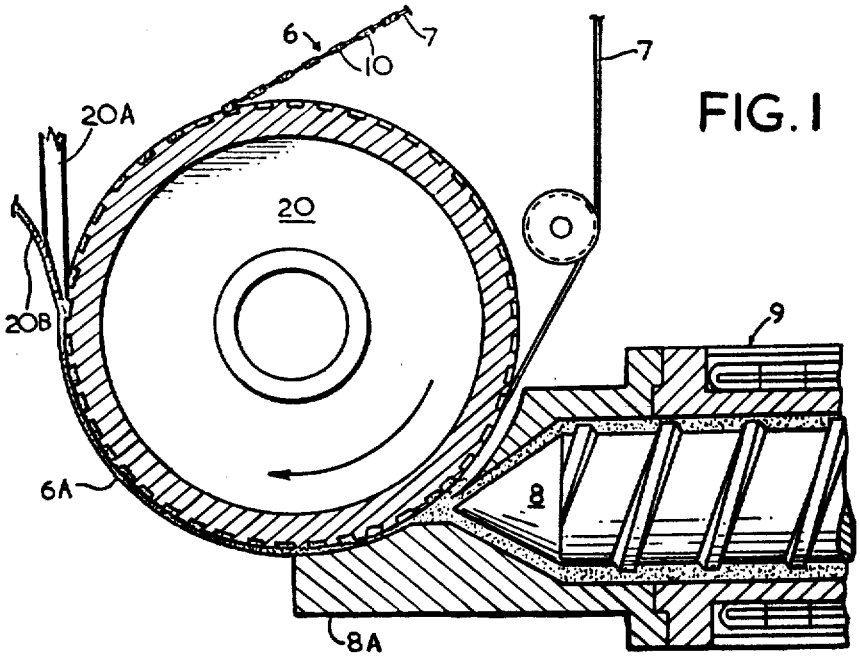
FIG. 1 is a sectional side view of a thermoplastic extrusion machine, showing the thermoplastic strip of this invention being formed.

According to one preferred form of production shown in FIG. 1, thermoplastic strips 6 are produced by the following method. For each strip 6, a pair of cords, such as cotton yarn threads 7 are fed in parallel alignment past the extrusion nozzle 8 of a thermoplastic extrusion machine 9. The machine 9 is designed and adjusted to discharge in semi molten state from the nozzle 8 a predetermined amount of thermoplastic material which is delivered to a casting roller 20 around which many pairs of the yarn threads 7 are passed. The profile of the roller 20 coacts with a lip 8A of the nozzle 8 to form a band 6A of material into one face of which is cast many closely spaced strips 6 each having a succession of elongated elements 10 on a respective pair of the yarn threads 7 preferably provided with opposed leg portions having enlarged ends 11 separated by an enlarged central portion 12 as shown in FIGS. 2 to 5. The enlarged ends 11 of each element 10 are formed around the cotton yarns 7. Preferably, before complete hardening of the thermoplastic material and before the band 6A has departed from the roller 20, a layer of the band 6A which forms a continuous backing 20B for the strips 6 is shaved from the band 6A by a knife 20A. After this stage the strips 6 are separate with their elements 10 connected only by the yarn threads 7. With progression of the yarn threads 7 from the roller 20 a plurality of ladder-like strips 6 are obtained through the attachment of the elements 10 to the yarn threads 7 at uniformly spaced intervals along their lengths. In this way both the bonding of the elements 10 to the yarn threads 7 and the casting of the elements 10 to a desired shape are obtained in a single process. Since at the point of departure of the strips 6 from the roller 20 the thermoplastic material is firmly adhered to the yarn threads 7 they perform the task of withdrawing the elements 10 from the individual moulds in the periphery of the roller 20.

Figure 2:
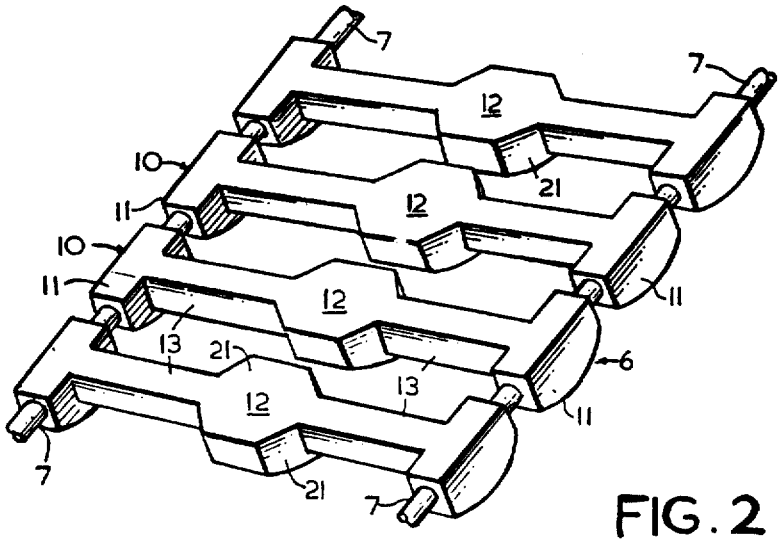
FIG. 2 is a greatly enlarged fragmentary perspective view of a strip according to a first form of the invention.
Figure 3:
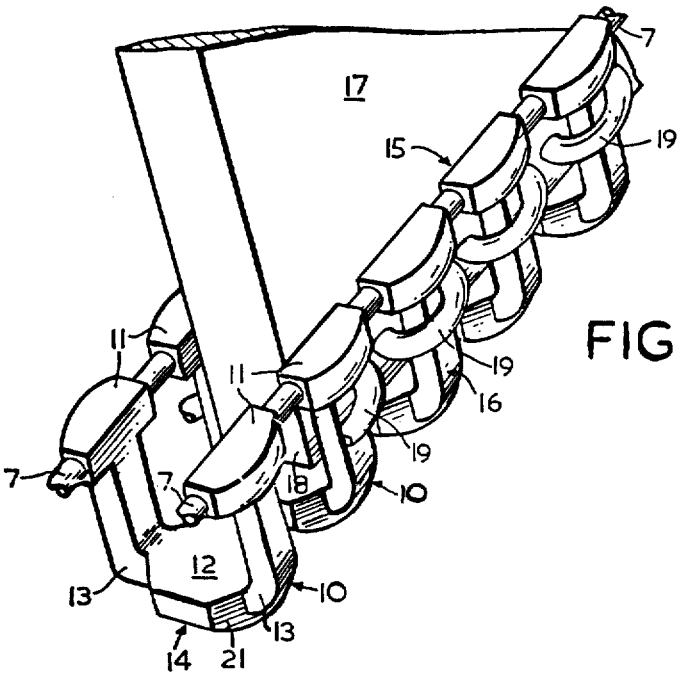
FIG. 3 is a fragmentary perspective view of the first form of strip bent along its length into U-shape and sewn to a tape.

One form of construction of the strip 6 is shown in FIGS. 2 and 3 where the thickness of the element 10 is reduced at 13 adjacent either side of its enlarged central portion 12. The ladder-like strip 6 is subsequently folded at either side of its longitudinal center line as shown in FIG. 3, that is along its length, so that each of the bridging elements 10 are bent at their two reduced portions forming stems 13. The result is to produce in the strip 6 a fold which renders it U-shaped in end elevation with the two yarn threads 7 located confronting and adjacent each other on one longitudinal edge 15 of the strip 6 and a projecting row of teeth 14 extending along the opposite longitudinal edge 16 of the strip 6.

The thermoplastic strip 6 may then be applied to a tape 17 to form a stringer for a sliding clasp fastener by locating a longitudinal edge portion 18 of the tape 17 within the bight of the U-shaped strip 6 and sewing the strip and tape together as at 19. The best location for the stitches 19 will invariably be about the stem 13 of the elements 10, i.e. between the enlarged end 11 and central portion 12. Therefore, the line of stitching 19 will extend along the length of the folded strip 6. Furthermore, instead of stitching 19, the strip 6 may be attached to tape 17 by cementing or by combination of both, or any other suitable means.

It will be seen that with the above construction the teeth 14 forming the interlocking elements of the fastener are linked together solely through interconnecting strands of cotton yarn threads 7, this deriving considerable flexibility and suppleness. Preferably the yarn threads 7 are so located within the enlarged ends 11 of the elements 10 that in the folded condition of the strip 6 they lie close to the confronting faces at the root ends of the U-folded strip 6. In this way greater flexibility is obtained since the yarn threads 7 are located close to the mid-point of the folded strip 6 and therefore to the tape 17. Also, it will be preferred in the casting of the elements 10 to provide the enlarged central portions 12 thereof with domed outer faces, as shown, or opposite chamfers (not shown) located on the outer edges confronting the central portions 12 of adjacent elements 10. The ends 11 may be similarly shaped. Due to this provision, the teeth 14 subsequently formed which serve as interlocking elements 10 in the fastener, provide for more efficient engagement and separation of the stringers of a fastener.

Figure 4:
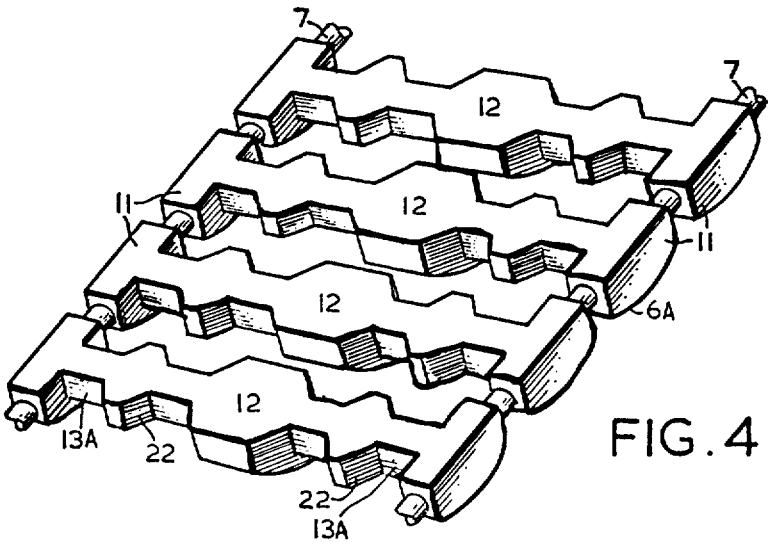
FIG. 4 is a fragmentary perspective view of a second form of strip.
Figure 5:
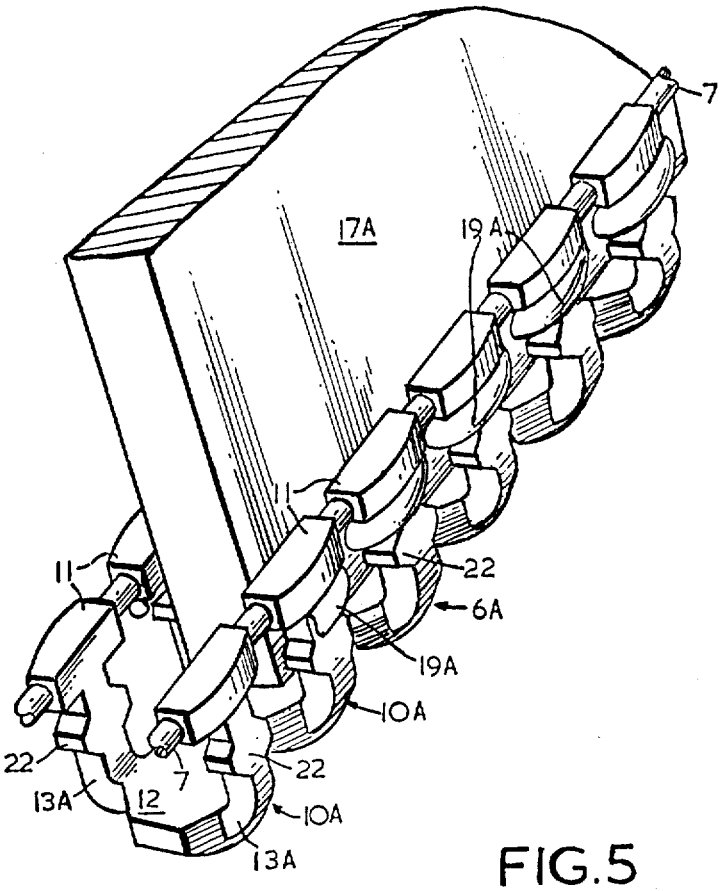
FIG. 5 is a fragmentary perspective view of the second form of strip bent along its length into U-shape and sewn to a tape.

When attachment to a tape 17 is effected by stitches 19 formed around the stems 13 of the fastener element 10, as shown in FIG. 3, it may be desirable to provide additional means to anchor the said elements in position. To this end a second form of strip 6A may be provided. This strip is shown in FIGS. 4 and 5. The elements 10A forming this strip 6A are provided with enlarged ends 11 and central portions 12 as before. Each stem 13A is provided with an additional enlargement 22 intermediate of said enlarged end 11 and central portion 12.

Figure 6:
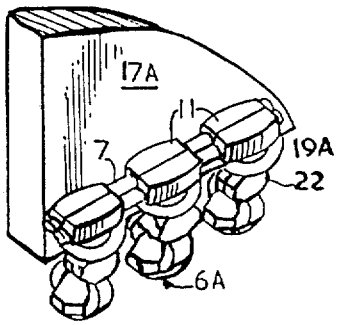
FIG. 6 is a similar view to FIG. 5 of the same strip but attached to one side of the tape.

When the strip 6A is bent into U-shaped configuration as shown in FIG. 5, it will be stitched to a tape 17A with the loops of stitching 19A surrounding the stems 13A between the enlarged ends 11 and the adjacent enlargement 22. In this way each element 10A is locked to the tape 17A against longitudinal displacement with respect to the stems 13A. Alternatively, the strip 6 may be located upon one face of the tape 17 at its longitudinal edge portion 18 as illustrated by FIG. 6.

The shape of the enlarged ends 11 in both embodiments is preferably as shown in which they are approximately rectangular with their length, i.e. greater dimension, extending longitudinally with the yarn threads 7. The length of the ends 11 should be such as to provide a narrow gap between adjacent ends which is spanned by the yarn 7. These provisions will give the slide of the slide fastener greater bearing surface and better anchorage of the elements 10 to the yarn threads 7. They also, to some extent, prevent breaking open of the fastener by resisting angling of its interlocking elements when the stringers are pinched by folding back upon themselves.

Several forms of thermoplastic strips have been described in the foregoing disclosure but it is to be understood that other forms are also feasible within the scope of this invention.

What we claim is:

1. A strip for use in the production of a stringer of a sliding fastener, comprising a row of transversely extending discrete strip-like thermoplastic elements, each element including an enlarged central portion, and opposed leg portions extending transversely from said central portion and defining respective sides of the strip; and two cords extending longitudinally along opposite sides of the strips, each transverse element including enlargements on the ends of the leg portions, the cords extending through the [enlargement] *respective enlargements* and being embedded therein, said enlargements extending from the leg portion longitudinally along the [cord] *respective cords* such that the enlargements of adjacent strips are spaced from one another, whereby said cords provide the sole interconnection between the elements, *the cords being offset from the center of the respective enlargements so that when the strip is folded in U-shape, the cords are disposed close to the confronting surfaces of the respective enlargements.*

2. A strip as claimed in claim 1, wherein said enlargements have a substantially rectangular shape.

[3. A strip as claimed in claim 2, wherein each cord extends through the row of transverse elements offset from the major axis of the rectangular enlargements.]

4. A strip as claimed in claim [3,] *1*, wherein the rectangular enlargements have a longer dimension which extends in the direction of the cord.

5. A strip as claimed in claim 1, wherein said leg portions have narrow stem portions connecting the central portion of a transverse element with the two ends of the transverse element, and an intermediate enlargement on each of said stems.

6. A strip for use in the production of a stringer of a sliding clasp fastener, comprising a row of discrete strip-like thermoplastic elements, each element including an enlarged central portion, and opposed leg portions extending transversely from said central portion and defining respective sides of the strip; two cords extending longitudinally along opposite sides of the strips, each cord being secured to the respective legs portion of each element, each leg portion including a substantially rectangular enlargement on the outer end of such leg portion, the cords extending through the enlargements and being embedded therein, said enlargements extending from the leg portions longitudinally along the cord such that the enlargements of adjacent strips are spaced from one another, whereby said cords provide the sole interconnection between the elements, a narrow stem joining each central portion with each end enlargement, and an intermediate enlargement on each of said stems, the strip being longitudinally folded into U-shape so that the two cords are in confronting relation and said enlarged central portions protrude laterally along one longitudinal edge of the folded strip.

7. A stringer for a sliding clasp fastener comprising a row of transverse, discrete strip-like thermoplastic elements, each element including an enlarged central portion, and opposed leg portions extending transversely from said central portion and defining respectively sides of the strip; two cords extending longitudinally along opposite sides of the strips, each cord being secured to the respective leg portion of each element, each leg portion including a substantially rectangular enlargement on the outer end of such leg portion, the cords extending through the enlargements and being embedded therein, said enlargements extending from the leg portions longitudinally along the cord such that the enlargements of adjacent strips are spaced from one another, whereby said cords provide the sole interconnection between the elements, a narrow stem joining each central portion with each end enlargement, and an intermediate enlargement on each of said stems, each stem being bent substantially at right angles to produce a U-shaped longitudinal fold along the row of transverse elements, a mounting tape having one longitudinal edge portion located within the fold, and a line of stitching extending longitudinally along said edge portion of the tape with individual stitches passing around respective stems between the intermediate enlargements and their adjacent rectangular end enlargements.

8. A stringer for a sliding clasp fastener comprising a row of transverse, discrete strip-like thermoplastic elements, each element including an enlarged central portion, and opposed leg portions extending from said central portion and defining respective sides of the strip; two cords extending longitudinally along opposite sides of the strips, each cord being secured to the respective leg portion of each element, each leg portion including a substantially rectangular enlargement on the outer end of such leg portion, the cords extending through the enlargements and being embedded therein, said enlargements extending from the leg portions longitudinally along the cord such that the enlargements of adjacent strips are spaced from one another, whereby said cords provide the sole interconnection between the elements, a narrow stem joining each central portion with each end enlargement, and an intermediate enlargement on each of said stems, each stem being bent substantially at right angles to produce a longitudinal fold along the row of transverse elements, a mounting tape having one longitudinal edge portion located to one side of the fold, and a line of stitching extending longitudinally along said edge portion of the tape with individual stitches passing around respective stems between the intermediate enlargements and their adjacent rectangular and enlargements.

* * * * *